United States Patent [19]
Suwabe

[11] Patent Number: 5,987,004
[45] Date of Patent: Nov. 16, 1999

[54] OPTICAL DISK WITH REINFORCING PLATE

[75] Inventor: Masatsugu Suwabe, Miyagi, Japan

[73] Assignee: Sony Corporation, Tokyo, Japan

[21] Appl. No.: 08/295,268

[22] Filed: Aug. 24, 1994

[30] Foreign Application Priority Data

Aug. 27, 1993 [JP] Japan .................................. 5-212412

[51] Int. Cl.⁶ .................................................. G11B 23/03
[52] U.S. Cl. .......................................... 369/290; 360/133
[58] Field of Search .................................. 369/290, 282; 360/133, 135

[56] References Cited

U.S. PATENT DOCUMENTS

| | | | |
|---|---|---|---|
| 4,694,370 | 9/1987 | Ommori et al. | 360/135 |
| 4,695,910 | 9/1987 | Maruyama et al. | 360/133 |
| 4,710,913 | 12/1987 | Matsushima et al. | 369/290 |
| 4,871,404 | 10/1989 | Murata et al. | 369/282 |
| 4,944,982 | 7/1990 | Kikuchi | 369/290 |
| 5,257,154 | 10/1993 | Sato | 360/135 |
| 5,265,086 | 11/1993 | Ota et al. | 360/135 |
| 5,369,632 | 11/1994 | Takahashi | 369/282 |

FOREIGN PATENT DOCUMENTS

| | | | |
|---|---|---|---|
| 60-191431 | 9/1985 | Japan | 360/135 |
| 62-80240 | 6/1987 | Japan . | |

*Primary Examiner*—Jefferson Evans
*Attorney, Agent, or Firm*—Limbach & Limbach L.L.P.

[57] ABSTRACT

An optical disk recording medium includes a single layer disk substrate having a hub provided on one side which includes a circular magnetic plate for effecting chucking of the optical disk. On the opposite side of the disk substrate a reinforcing plate is attached for reducing disk warpage during chucking, loading etc. The circular magnetic plate includes a centering opening for disk chucking, while a center opening of the reinforcing plate is larger in diameter than the centering opening. The reinforcing plate covers a central opening formed in the disk substrate and includes a boss portion which is projected into the opening. A groove is provided in the reinforcing plate at the outer circumference of the boss portion for retaining excess adhesive when the substrate is affixed to the reinforcing plate.

8 Claims, 4 Drawing Sheets

OPTICAL DISK WITH REINFORCING PLATE

BACKGROUND OF THE INVENTION

1. Field of the Invention

The present invention relates generally to an optical data recording medium. Particularly, the present invention relates to a readable/writable optical disk which is supported on a rotatable disk table when in use.

2. Description of the Related Art

In optical disk technology, a small laser spot is utilized for reading and/or writing high density information data to a recording playback layer of the disk material. Generally, three types of such disks are available, read only, write once read many and rewritable.

For many types of data which may now be accessed by computer users, such as coded data, audio data and graphic data, an erasable rewritable type of optical or magneto optical disk is the most useful.

Referring to FIGS. 5 and 6, a conventional example of such type of magneto optical disk will be discussed hereinbelow.

FIG. 6 shows a cross-sectional view of the conventional magneto-optical disk of FIG. 5 as supported on a disk table 6 of a disk drive (not shown) for carrying out reading/writing operations. The disk 1 comprises a disk substrate 2 both sides of which have an opening 2a formed at a center portion thereof. The disk substrate is formed of a combustible plastic resin generally molded by injection of the resin through the central openings. At one side of the disk substrate a circular plastic hub 3 having an installation groove 3a formed at an inner peripheral side thereof is provided.

Within the hub 3, retained by the installation groove 3a, a circular mounting plate 4 having a center opening 4a is provided. The center opening 4a allows insertion of an output shaft 5 of a spindle motor (not shown) of the disk drive (not shown) for rotatingly driving the magneto-optical disk 1.

The disk table 6 supporting the disk 1 is comprised of a table body 7 including an annular portion 7a and an annular disk support portion 7b of the table body 7, the disk support portion 7b being effective for determining correct positioning of the disk 1. The lower portion of the table body 7 is inset with a circular yoke 8 and, set between the yoke 8 and the circular mounting plate 4 an annular magnet 9 is disposed for effecting high speed rotation of the disk 1 according to operation of the spindle motor (not shown).

In addition, disposed around an outer periphery of the annular disk support portion 7b a friction ring 10, formed of rubber or the like, is provided for preventing slipping of the disk 1 when loaded on the disk table 6.

According to the above arrangement, when the disk substrate 2 is set on the table body 7 such that the circular mounting plate 4 is engaged by the magnetic force of the magnet 9 and the output shaft 5 of the spindle motor (not shown) is inserted into the centering opening 4a of the circular mounting plate, the outer circumference of the output shaft 5 is in touching contact with the inner cirumference of the centering opening 4a.

Such a conventional magneto-optical disk as described above has been disclosed, for example, in Japanese Utility Model 62-80240.

Increased demand for such variable magnetic overwriteable disk systems has been forecast, thus systems having advantages including low cost, simple single layer construction etc., are desired.

In such an optical disk system as described above, the disk substrate is generally formed of a polycarbonate resin, or the like, according to this, in order to minimize occurence of comma type aberration, a substrate thickness of 1.2 mm is set. At this, a flexibility or resilience of the substrate is lowered considerably. The effect of this is that when the hub 3 is chucked in the table body 7, the disk substrate 2 abuts the annular disk support portion 7b of the table body 7 under pressure such that warpage of the disk substrate may easily occur.

A degree of warpage to which the substrate 2 is susceptible is directly connected to the resilience or flexibility of the substrate material.

At this, flexibility is proportional to thickness to the third power. That is, if theoretically, the warpage of a single layer substrate is expressed as $S_1$ and of a two layer substrate as $S_2$, comparatively; $S_1 = 2^3 \times S_2$, i.e. $S_1 = 8 \times S_2$.

Accordingly, such warpage, particularly in a single layer substrate type disk, cannot be ignored as this will have an adverse effect on data reading and writing operations and degrade disk performance.

Thus it has been required to provide an optical disk by which warpage of a substrate portion of the disk is prevented and degrading influence of warpage on data reading and writing operations is prevented.

SUMMARY OF THE INVENTION

It is therefore a principal object of the present invention to overcome the drawbacks of the related art.

It is a further object of the present invention to provide an optical disk and disk table arrangement by which disk warpage is prevented so data reading and writing operations are not impaired.

In order to accomplish the aforementioned and other objects, I propose an optical disk recording medium comprising: a single layer disk substrate, information data being writable in a data read/write side thereof, the substrate further having an opening formed therethrough at a central portion thereof; a hub portion provided on one side of the disk and covering the opening, the hub portion including a circular magnetic plate having a centering opening provided at a position corresponding to a center of the disk; and a reinforcing plate provided on a side of the substrate opposite a side on which the hub portion is provided, the reinforcing plate also covering the opening of the substrate and having a center opening formed therethrough.

BRIEF DESCRIPTION OF THE DRAWINGS

In the drawings:

FIG. 2 (B) shows a top view of the backing plate of FIG. 2 (A);

DESCRIPTION OF THE PREFERRED EMBODIMENT

Figure 1:
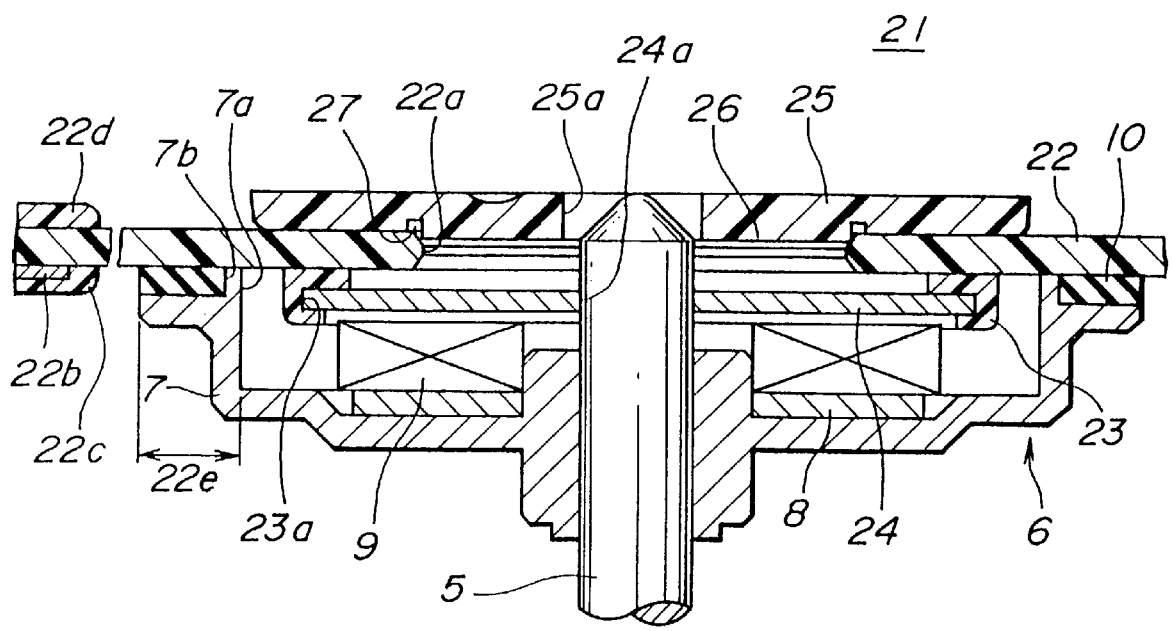
FIG. 1 shows a cross-sectional view of an optical disk and disk table according to a preferred embodiment of the invention.
Figure 2A:
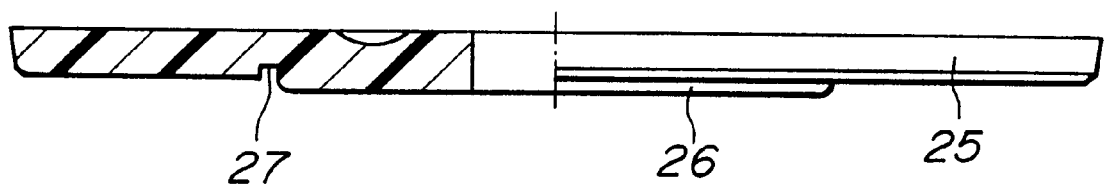
FIG. 2 (A) shows a partially cross-sectional view of a backing plate of the optical disk according to the invention.
Figure 2B:
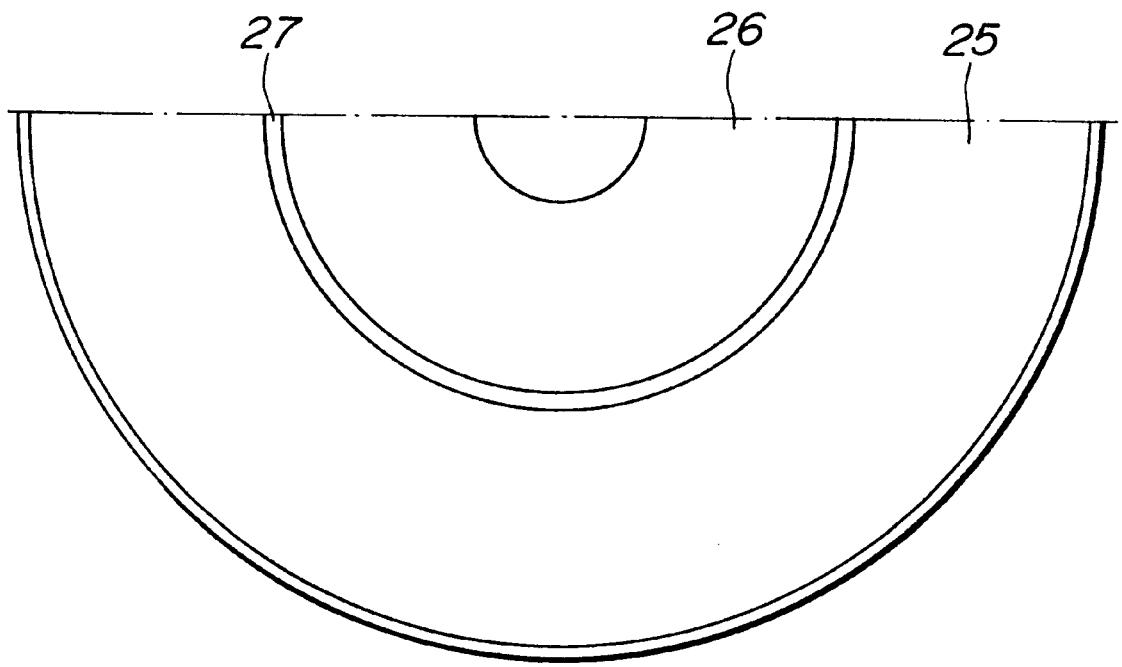
Figure 3:
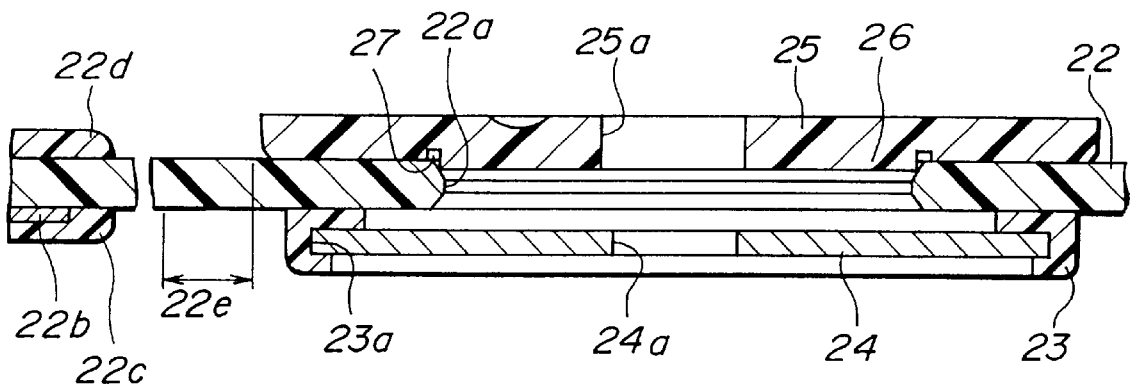
FIG. 3 is a cross-sectional view of the optical disk according to the invention.

Referring now to the drawings, particularly to FIG. 1, a cross-sectional view of a first preferred embodiment of an optical disk and disk mounting arrangement is shown, FIGS. 2(A) and 2(B) illustrate cross-sectional and plan views of the optical disk according to the invention, while FIG. 3 shows a cross-section view of the optical disk 21 of the invention.

As may be seen in FIG. 3, a magneto-optical disk 21 (hereinbelow: disk 21) includes a substrate 22, the substrate is circular in shape and an opening 22a is formed perpendicular to the plane of the disk substrate 22 through the disk substrate 22 at a center area thereof. At a side of the disk which contacts a disk table 6, a ring-shaped hub 23 is attached which includes, at an inner circumferential portion thereof, an annular installation groove 23a. The hub 23 may be attached to the side of the disk substrate by ultrasonic welding or the like.

Installed in the installation groove 23a of the hub 23 a circular mounting plate 24 is fitted at the side of the disk which contacts the disk table 6. The circular mounting plate 24 includes a centering opening for insertion of an output shaft 5 of a spindle motor (not shown) of a disk drive (not shown). Also, provided on a side of the disk substrate 22 opposite the side thereof which faces the disk table, a circular backing plate 25 is disposed having a center opening 25a corresponding to the position of the centering opening 24a of the circular mounting plate 24.

The disk substrate 22 is a single layer of a material such as polycarbonate resin or the like and has a thickness of 1.2 mm (excluding a hard coating as will be explained hereinlater). At the disk table side of the substrate 22 a data read/write layer 22b is formed in an annular configuration radially outward of the hub 23. The data read/write layer 22b is irradiated by a laser beam (not shown) associated with the disk drive (not shown) for effecting data reading and writing operations of the magneto-optical disk 21.

The data read/write layer 22b is covered with a protective layer 22c which may be formed of ultra-violet hardened synthetic resin, or the like. At this, an upper side, or side of the disk substrate 22 opposite the side contacting the disk table 6, is also covered with a so-called hard 'coat' layer 22d which may also be formed of ultra-violet hardened synthetic resin. The hard coat layer is also formed in an annular configuration which is disposed radially outward of the backing plate 25. By provision of the protective layers 22c and 22d the read/write layer 22b and the disk substrate 22 are suitably protected from damage due to handling, dust, etc.

Further, at a disk table side of the disk substrate 22, an annular chucking, or clamping area 22e is defined radially outward of the opening 22a. The annular clamping area 22e is established with a diameter of between 28–34 mm relative to the axis of the output shaft 5 of the spindle motor (not shown).

Further, the characteristics of the data read/write layer 22b and the protective layer 22c are established at 2000 Angstroms with a thickness of 5–20 μm while the hard coat layer 22d is formed with a thickness of between 5–20 μm.

The circular plate is of metallic material such that the magneto optical disk 21 may be suitably mounted on the disk table 6 by magnetic attraction between a magnet 9 of the disk table 6 and the circular plate 24 at the corresponding side of the disk substrate 22.

On the other hand, the backing plate 25 may be formed of the same material as the disk substrate 22 (i.e. polycarbonate resin etc.) and includes a circular central projecting portion 26 formed coaxially with the backing plate at a side thereof which faces the surface of the disk substrate so as to project slightly into the opening 22a of the substrate 22. The thickness of the backing plate 25 is established to be smaller than a thickness of the hub 23, that is, between 0.1–3.0 mm, while the diameter of the backing plate 25 is set to be larger than that of the hub 23 (i.e. 28 mm).

Also, formed at the outer circumference of the central projecting portion 26, on the same side as the central projecting portion 26, an annular channel 27 is cut into the backing plate 25. According to this, when the backing plate 25 is adhered to the substrate 22 via an adhesive, excess adhesive flows into the annular channel 27 to be retained therein. Thus, during drying, excess adhesive will not act in a manner so as to cause warpage of the disk or plate since the excess is held in the annular channel 27, uniform circumferential adhesion of the backing plate is assured.

According to the above construction, when the magneto-optical disk 21 according to the invention is mounted on the disk table of a disk drive (not shown), warpage of the disk 21 is suitably prevented.

In addition, in the magneto-optical disk according to the invention, the center opening of the backing plate is established at 4.3 mm while the centering opening of the circular plate 24 is set at 4 mm, for the reasons set forth below.

When the magneto-optical disk 21 is mounted on the disk table 6, the output shaft 5 of the spindle motor (not shown) is inserted well into the centering opening 24a of the circular plate 24. Since it is difficult to assure exact alignment between the centering opening 24a of the circular plate 24 mounted in the hub 23 and the center opening 25a of the backing plate 25, the center opening 25a of the backing plate 25 is made to be slightly larger to prevent interference with the output shaft 5 of the spindle motor (not shown) such that the disk may be easily loaded and unloaded to a disk drive (not shown) even if alignment between the centering opening 24a and the center opening 25a is not perfect.

When the disk 21 is mounted in the disk table 6 the annular clamping area 22e is supported by the annular disk support portion 7b of the disk table 6 while the hub 23 is surrounded by the annular portion 7a and chucking is effected by magnetic attraction between the circular plate 24 of the disk hub 23 and the magnet 9 and the yoke 8 of the disk table. Meanwhile, correct centering is assured since the inner circumference of the centering opening 24a closely contacts the outer circumference of the output shaft 5 of the spindle motor (not shown).

At this, the substrate 22 is reinforced by the backing plate 25 proximate the central opening 22a thereof near where the magneto-optical disk is supported by the annular disk support portion 7b. For this reason the thickness of the backing plate 25 is increased in the vicinity of the periphery of the central opening 22a.

According to the construction of this embodiment, warpage of the disk substrate 22 during disk loading operation, chucking etc., may be suitably restrained. The present inventor have proven the above through experimentation through comparative measurement of warpage with and without use of the backing plate 25 as may be seen in FIG. 4.

Line A represents use of a disk 21 without provision of the backing plate 25 while line B represents a disk 21 inlcuding a backing plate 25. As may be appreciated, without the backing plate the warpage of the disk substrate 22 was three times as much as with provision of the backing plate while the clamping strength (degree of magnetic attraction between the circular plate 24 and the magnet 9) remained the same.

Figure 4:
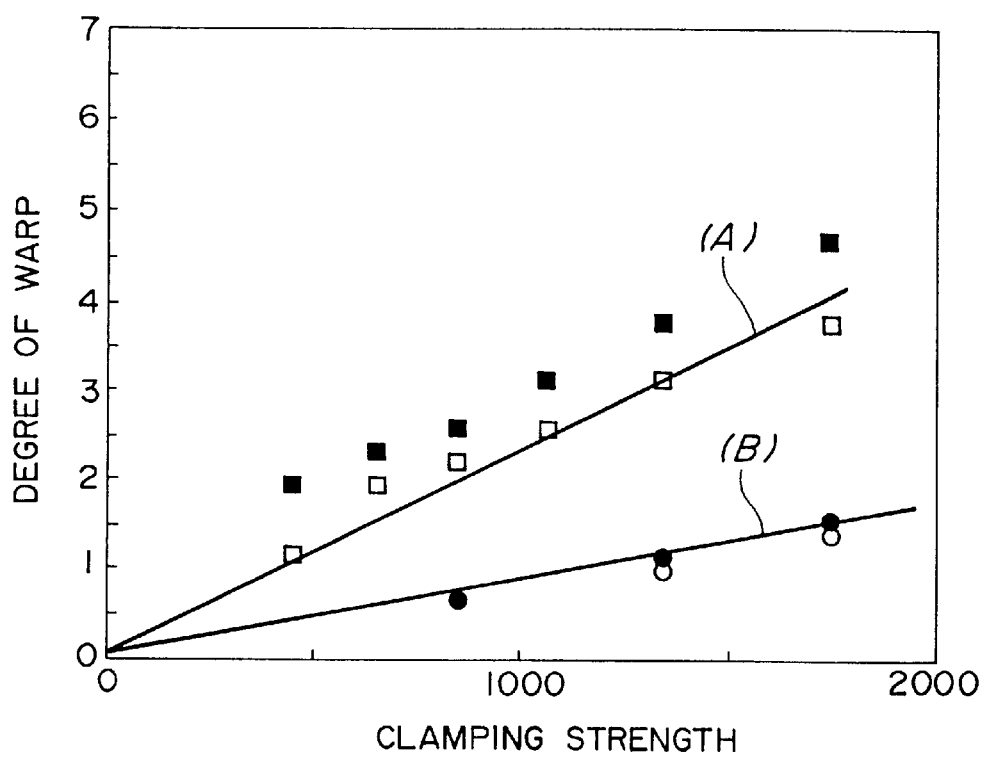
FIG. 4 is a cross-sectional, explanatory view of a clamping arrangement for chucking operation of the optical disk according to the invention.
Figure 5:
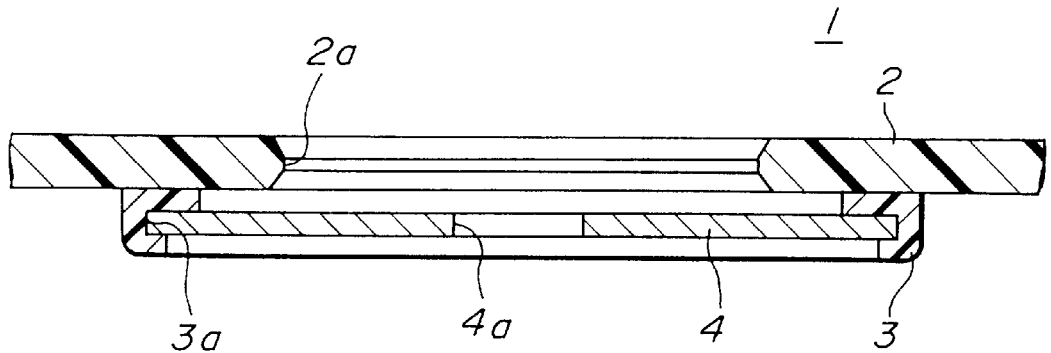
FIG. 5 shows a cross-sectional view of a conventional magneto optical disk.
Figure 6:
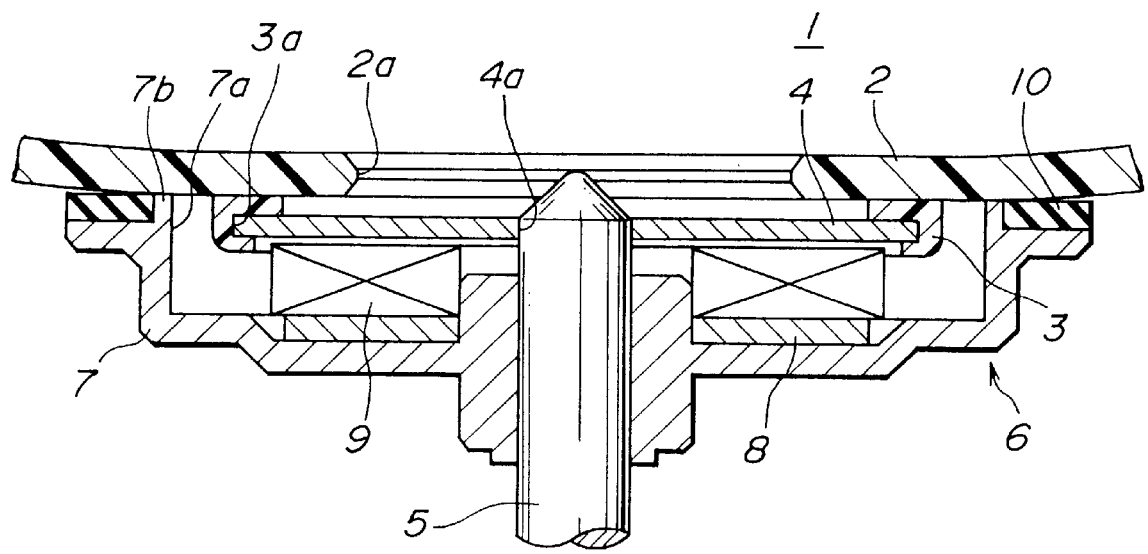
FIG. 6 is a cross-sectional view of the conventional disk of FIG. 5 mounted on a disk table of a disk drive.

The measurements where effected two positions a1, a2 and b1, b2 on a single layer 5.25 inch disk, and r is used to designate a distance of the measurement point from the disk center (eg. r=32 35, 55, etc.). In FIG. 4 measurments points a1, b1 (r=35) are shown in black while measurement points a2, b2 are shown in black.

According to the embodiment, warpage due to operations other than chucking and loading may also be reduced.

Further, since the backing plate 25 reinforces the substrate 22, malfunctions caused by disk warpage may be substantially reduced and design freedom in utilizing such a disk is greatly extended.

Further, while the backing plate of the present embodiment is formed of synthetic resin, a metal backing plate may also be used with the same advantages.

Of course, other suitable outer circumferential dimensions of the backing plate 25 may be utilized other than disclosed in connection with the above-described embodiment.

The above construction may also be applied to other types of disks rather than the magneto-optical disk of the embodiment with the same advantages, in addition such a disk 21 as described herein may be utilized mounted within a disk cartridge (not shown) or the like.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An optical disk recording medium comprising:

a single layer disk substrate, information data being writable in a data read/write side thereof, said substrate further having an opening formed therethrough at a central portion thereof;

a hub portion provided on one side of said disk and covering said opening, said hub portion including a circular magnetic plate having a centering opening provided at a position corresponding to a center of said disk;

a reinforcing plate provided on a side of said substrate opposite said one side on which said hub portion is provided, said reinforcing plate also covering said opening of said substrate and having a center opening formed therethrough.

2. An optical disk recording medium as set forth in claim 1, wherein a diameter of said center opening of said reinforcing plate is greater than a diameter of said centering opening of said hub portion.

3. An optical disk recording medium as set forth in claim 1, wherein said reinforcing plate is circular and is mounted concentrically with said circular magnetic plate and has a diameter greater than a diameter of said hub portion.

4. An optical disk recording medium as set forth in claim 1, wherein said reinforcing plate has a circular boss portion substantially equal in diameter to said opening of said disk substrate and which is projected thereinto, a groove being formed in said reinforcing plate in a space between the circumference of said opening and the outer circumference of said boss portion.

5. An optical disk recording medium as set forth in claim 4, wherein said reinforcing plate is affixed to said substrate by an adhesive.

6. An optical disk recording medium comprising:

a single layer disk substrate, information data being writable in a data read/write side thereof, the substrate further having an opening formed therethrough at a central portion thereof;

a hub portion attached to a bottom side of the disk substrate, the hub portion including a circular magnetic plate having a centering opening provided at a position corresponding to a center of the disk;

a reinforcing plate attached on an upper side of the disk substrate opposite the bottom side on which the hub portion is attached, the reinforcing plate having a diameter greater than the opening of the disk substrate.

7. An optical disk recording medium as set forth in claim 6, wherein the reinforcing plate is circular and is mounted concentrically with the circular magnetic plate and has a diameter greater than a diameter of the hub portion.

8. An optical disk recording medium as set forth in claim 6, wherein the reinforcing plate has a circular boss portion substantially equal in diameter to the opening of the disk substrate and which is projected thereinto, a groove being formed in the reinforcing plate in a space between the circumference of the opening and the outer circumference of the boss portion.

* * * * *